United States Patent
Fuentes et al.

(10) Patent No.: US 10,311,647 B2
(45) Date of Patent: Jun. 4, 2019

(54) THREE DIMENSIONAL IMAGE GENERATION

(71) Applicant: Gravity Sketch LIMITED, London (GB)

(72) Inventors: Daniela Maria Paredes Fuentes, London (GB); Guillaume Couche, London (GB); Pierre-Yves Paslier, London (GB); Oluwaseyi Sosanya, London (GB)

(73) Assignee: Gravity Sketch Limited, London (GB)

( * ) Notice: Subject to any disclaimer, the term of this patent is extended or adjusted under 35 U.S.C. 154(b) by 153 days.

(21) Appl. No.: 15/226,315

(22) Filed: Aug. 2, 2016

(65) Prior Publication Data
US 2016/0343174 A1 Nov. 24, 2016

Related U.S. Application Data

(63) Continuation of application No. PCT/GB2015/050162, filed on Jan. 23, 2015.

(30) Foreign Application Priority Data

Feb. 5, 2014 (GB) .................................. 1401974.9

(51) Int. Cl.
| | | |
|---|---|---|
| *G06F 3/0488* | (2013.01) | |
| *G06F 3/0484* | (2013.01) | |
| *G06T 19/00* | (2011.01) | |
| *G06T 19/20* | (2011.01) | |

(Continued)

(52) U.S. Cl.
CPC .............. *G06T 19/20* (2013.01); *G06F 3/011* (2013.01); *G06F 3/017* (2013.01); *G06F 3/0488* (2013.01);

(Continued)

(58) Field of Classification Search
CPC .............. G06F 3/04883; G06F 3/0488; G06F 3/04845; G06F 3/04815; G06T 19/00;

(Continued)

(56) References Cited

U.S. PATENT DOCUMENTS 7,403,376 B2 * 7/2008 Tsang ..................... F16M 11/10
248/550
2011/0148918 A1 6/2011 Ishizawa et al.
(Continued)

FOREIGN PATENT DOCUMENTS

EP 2560145 A2 2/2013

*Primary Examiner* — Ke Xiao
*Assistant Examiner* — Andrew Shin
(74) *Attorney, Agent, or Firm* — EIP US LLP

(57) ABSTRACT

Apparatus, method and computer program for use in generating a three dimensional image. A three dimensional image volume comprising a three dimensional image is displayed using a visualization device in a way that the position and orientation of an input surface is visible within the three dimensional image volume. User input indicative of a two dimensional image provided in the plane of the input surface is received via the input surface. First positional data indicative of a relative position and orientation of the input surface in relation to the three dimensional image volume is then determined. Subsequently, the three dimensional image is modified to include a three dimensional representation of the two dimensional image, the three dimensional representation having a position and orientation within the three dimensional image volume determined from the first positional data.

21 Claims, 9 Drawing Sheets

(51) Int. Cl.
  *G06T 15/00* (2011.01)
  *G06F 3/01* (2006.01)
  *G06F 3/0481* (2013.01)
  *G06T 3/20* (2006.01)
  *G06T 3/40* (2006.01)
  *G06T 3/60* (2006.01)
  *G06T 15/08* (2011.01)

(52) U.S. Cl.
  CPC ...... *G06F 3/04815* (2013.01); *G06F 3/04845* (2013.01); *G06T 3/20* (2013.01); *G06T 3/40* (2013.01); *G06T 3/60* (2013.01); *G06T 15/08* (2013.01); *G06T 19/006* (2013.01)

(58) Field of Classification Search
  CPC ....... G06T 17/10; G06T 19/006; G06T 19/20; G06T 3/20; G06T 3/60; G06T 15/08; G06T 15/00; G06T 15/10; G06T 15/205; G06T 2219/20; G06T 2219/2016; H04N 13/344; H04N 13/332; G06K 9/00375; G06K 9/00402; G06K 9/222; G06K 9/22
  See application file for complete search history.

(56) References Cited

U.S. PATENT DOCUMENTS

| | | | |
|---|---|---|---|
| 2011/0164029 A1* | 7/2011 | King | G06F 3/04883 345/419 |
| 2013/0057540 A1 | 3/2013 | Winnemoeller | |
| 2013/0222410 A1* | 8/2013 | Kameyama | H04N 13/344 345/589 |

* cited by examiner

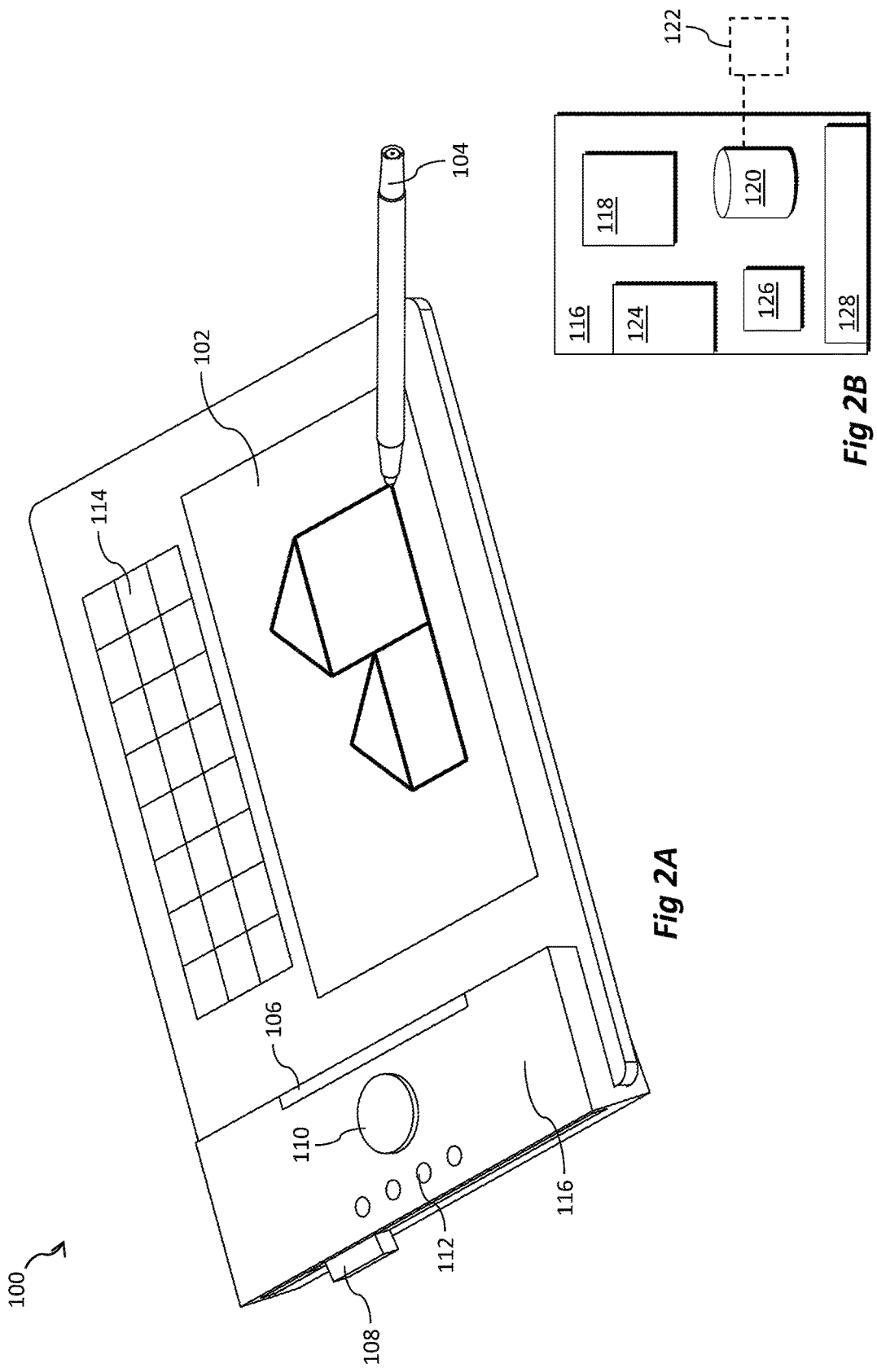

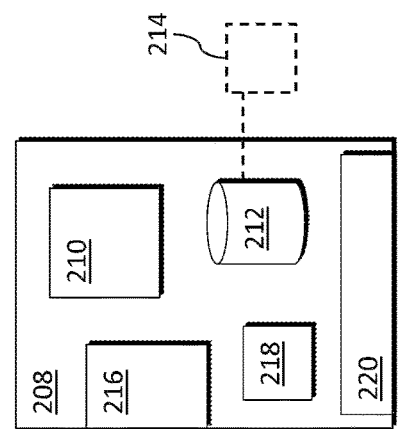
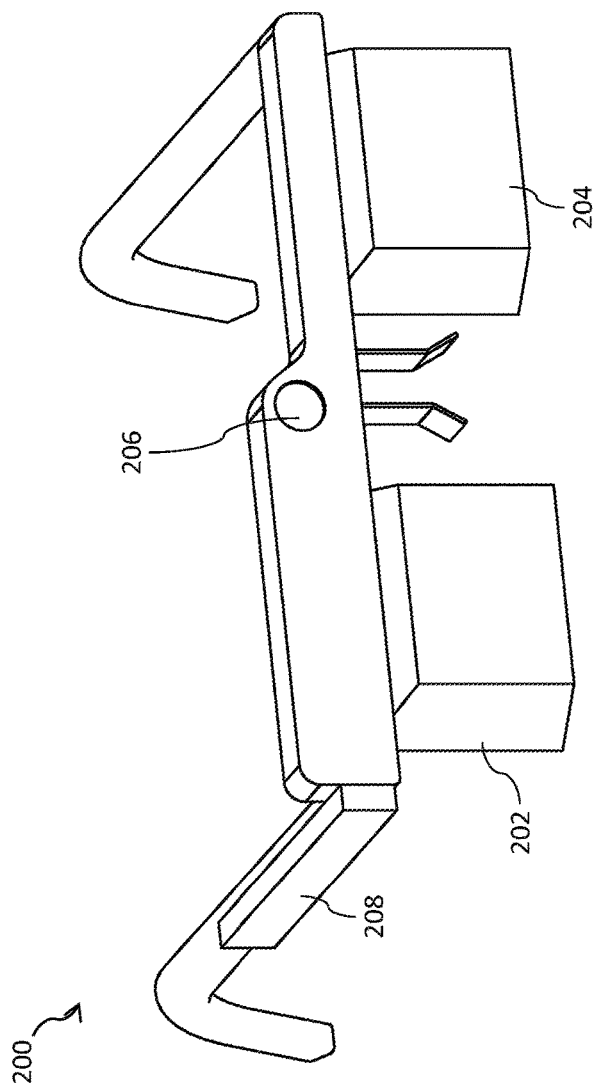
Fig 3A
Fig 3B

THREE DIMENSIONAL IMAGE GENERATION

CROSS-REFERENCE TO RELATED APPLICATIONS

This application is a continuation of International Application No. PCT/GB2015/050162, filed Jan. 23, 2015, which claims the benefit of GB Application No. 1401974.9, filed Feb. 5, 2014. Each of the above-referenced patent applications is incorporated by reference in its entirety.

BACKGROUND OF THE INVENTION

1. Field of the Invention

The present invention relates to methods and apparatus for three dimensional image generation, and in particular for drawing a three dimensional image using a computer.

2. Description of the Related Technology

Image creation using a computer is well established in two dimensions. A typical system provides a screen which displays a two dimensional image and an input surface onto which a user may provide user input using a stylus. In some cases the input surface and the screen may be the same entity, thus the user is able to directly "draw" onto an image displayed on the screen. A commercial example of such a system is the Cintiq® tablet produced by Wacom®. The use of such a system for two dimensional image creation is, intentionally, analogous to using a pencil, brush or other such tool on paper or canvas.

Such two dimensional systems thus provide an instinctive and easy to use system for enabling a user to create an image in two dimensions. However, such ease of use has been difficult to replicate in the creation of three dimensional images. Here, three dimensional images is intended to mean an image which has depth data, meaning that the image can be rotated to see it from other angles. The term "three dimensional image" is not intended to cover a two dimensional image representing a three dimensional object—for example a photograph.

One known method of creating a three dimensional image is to build a three dimensional shape as a series of steps, using a system having access to preconfigured functions. For example, a radially symmetrical shape, representing e.g. a vase or glass, may be created by providing a curve defining an outer surface of the shape, and rotating that curve about an axis. In this example the system has access to a rotation function. Such systems have drawbacks in that a user is not only required to have the ability to visualize an object prior to drawing, but also has to be able to express this visualization as the appropriate functions (i.e. as the rotation). In the theory of multiple intelligences proposed by Howard Gardner, the ability to visualize is called visual-spatial intelligence and the ability to express a shape as the appropriate functions is called logical-mathematical intelligence.

The requirement to use both these so called intelligences makes it harder for users to be effective in creating a three dimensional image. For instance, a user who is able to visualize an image, and has the ability to draw that image in two dimensions, may have good visual-spatial intelligence, but may then struggle to use this ability to effectively create a suitable image in three dimensions due to a difficulty in being able to express the visualized image as the appropriate functions, i.e. because that user has poor logical-mathematical intelligence.

It is an object of the present invention to make the process of creating a three dimensional image easier for a user.

SUMMARY

In accordance with at least one embodiment, methods, devices, systems and software are provided for supporting or implementing functionality to generate a three dimensional image.

This is achieved by a combination of features recited in each independent claim. Accordingly, dependent claims prescribe further detailed implementations of various embodiments.

According to an exemplary embodiment, there is provided an apparatus for use in generating a three dimensional image, the apparatus comprising: an input surface; a visualization device, a processing system; and a memory, wherein the memory comprises computer readable instructions which, when executed by the processing system, cause the apparatus to: display, using the visualization device, a three dimensional image volume comprising a three dimensional image, the position and orientation of the input surface being visible within the three dimensional image volume; receive user input via the input surface, the user input being indicative of a two dimensional image provided in the plane of the input surface; determine first positional data indicative of a relative position and orientation of the input surface in relation to the three dimensional image volume; and modify the three dimensional image to include a three dimensional representation of the two dimensional image, the three dimensional representation having a position and orientation within the three dimensional image volume determined from the first positional data.

In contrast to the known system described above, this described apparatus does not require a user to define functions to describe a three dimensional image. Instead, by having the position and orientation of the input surface being visible within the image volume, and by receiving user input indicative of a two dimensional image provided in the plane of the input surface, the apparatus enables a user to add to a three dimensional image using a more instinctive two dimensional input. For example, the user may effectively draw, as if drawing onto a sheet of paper, into the three dimensional image. Consequently, the user is not required to translate a visualized image into functions to create the image, facilitating the image generation for the user. This system can also be contrasted with three dimensional drawing systems where a user can freely move an input indication in three dimensions. While such systems enable the user to directly "draw" in three dimensions, ease of use and accuracy of input are reduced. For example, use of the input surface steadies the user input (by preventing movement perpendicular to the input surface, and resisting via friction movement in the plane of the input surface). Furthermore, pressure, angle of input device to surface and other factors may be used to define the input (changing the shape or size of e.g. a brush stroke). Finally, it should be noted that a two dimensional input surface, such as the Cintiq® described earlier, may be used for user input in a three dimensional image creation system. However, in such systems the input surface is not visible within the image volume but rather is visually separated from the image volume. Conceptually this can be visualized as the three dimensional image being viewed through a window, with the input surface being the window. This requires the user to mentally compensate for this separation and adjust his or her inputs accordingly making image generation harder for the user.

The visualization device may comprise an augmented reality display device configured to display the three dimensional image volume while enabling a user to see the input surface. Alternatively, the visualization device may comprise a virtual reality display device configured to display both the three dimensional image volume and a virtual rendering of the input surface, the virtual rendering of the input surface being positioned and orientated based on a physical position and orientation of the input surface.

To enable the input surface to be visible, the apparatus may use augmented reality. This means that the user can view the input surface, as well as any other objects in the surrounding space including e.g. their own hands, and is also provided with a representation of the three dimensional image volume on and around the input surface. Thus the user can easily see where the input surface is located in relation to the image volume, and therefore can provide inputs in a desired manner. The same effect can be created using a virtual realty system—i.e. one where the user sees only a computer generated visualization and cannot view the surrounding space. In such a system, the input surface in the virtual world would correspond to the input surface in the real world to maintain the instinctive link between input and the image.

The visualization device may comprise a first position detecting part; the apparatus may comprise a second position detecting part, separate from the first position detecting part, the first and second position detecting parts configured to cooperate to enable determination of a relative position and orientation of the visualization device in relation to the second position detecting part; and the memory may be configured to store second positional data indicative of a relative position and orientation, in relation to the second position detecting part, at which the three dimensional image volume is to be displayed, wherein the computer readable instructions, when executed by the processing system, may cause the apparatus to: retrieve, from memory, stored second positional data; determine, using the first and second position detecting parts, third positional data indicative of a relative position and orientation of the visualization device in relation to the second position detecting part; and calculate, using the second and third positional data, a relative position and orientation for the three dimensional image volume in relation to the visualization device for use in the displaying of the three dimensional image volume.

In embodiments, the visualization device may comprise a form of user mountable display configured to provide an image to one or both eyes of a user. In other words, the user is provided with glasses or a heads-up-display (HUD). Such a visualization device may move with the user. Consequently, to enable the image to be properly displayed, the apparatus may use position detecting parts. One such part may be an emitter, and the other a detector able to detect the relative position and orientation of the emitter in relation to the detector. A first of these parts (which can be either the emitter or the detector), may be connected to, or a part of, the visualization device. A second part may form a reference in relation to which the image volume is displayed. The relationship between the second position detecting part and the image volume may be relatively constant and stored in memory. Therefore, by retrieving this relatively constant relationship—the second positional data from the memory and determining the third data using the first and second position detecting parts the apparatus able to display the image volume so that the image volume is held relatively constant, irrespective of the movement of the visualization device. This provides the user with a stability in the image to be able to effectively provide input, and enables the user to, e.g. move around a displayed image volume to view it from different perspectives. The emitter and the detector may use a number of systems to operate. For example the detector may comprise an optical sensor such as a camera, and the emitter may comprise a series of LEDs (e.g. visible or infrared) arranged in a known manner, or an image (in the latter case it will be appreciated that the emitter may not be powered).

The apparatus may be configured to receive user input indicative of a desired change in position and/or orientation of the three dimensional image volume, and the computer readable instructions, when executed by the processing system, may cause the apparatus to modify the stored second positional data in accordance with the received user input. This user input may be received via the input surface. Alternatively, the apparatus may comprise one or more control elements configured to receive the user input.

As described above, the relationship between the image volume and the second position detecting part may be relatively constant. However, a completely static relationship may not be desired, and so the user may be provided with the ability to modify it. Therefore, using either the input surface (for example using so called "gestures") or by using one or more control elements, the user may provide user input to modify the second data, and thus modify how the image volume is displayed in relation to the second position detecting part. Thus the user can easily reposition the image as desired.

The second position detecting part and the input surface may be physically connected whereby to have a constant relative position and orientation. Furthermore, the user input may be indicative of one or more of: a rotation of the image volume about an axis in the plane of the image surface; a rotation of the image volume about an axis perpendicular to the plane of the image surface; a translation of the image volume in a direction in the plane of the image surface; a translation of the image volume along a direction perpendicular to the plane of the image surface; and a change in a relative size of the image volume.

The computer readable instructions, when executed by the processing system, may cause the apparatus to: receive user input identifying a two dimensional image within the three dimensional image; modify the second positional data such that the image volume is displayed with the identified two dimensional image aligned with the input surface.

In some embodiments, the second position detecting part is connected to the input surface. This has the effect that the image volume is held relatively constant in relation to the input surface. As describe above, the input surface is visible within the image volume, and therefore the user is presented with a unitary visual arrangement comprising the image volume and the input surface. This enables consistent inputs to be provided, as the use may provide suitable user input to position the input surface in a desired position within the input volume before providing user input to modify the image. In such embodiments, user input may be provided which is indicative of a change in position or orientation of the image in relation to the input surface—this corresponding to a suitable change in position or orientation of the image in relation to the second position detecting part. As described above, the image is modified by providing two dimensional images into the three dimensional image. In embodiments it may be possible to select a two dimensional image which already exists within the three dimensional image (i.e. having being previously drawn) and cause the apparatus to modify the position and rotation of the image volume so that the input surface is aligned with the selected two dimensional image. This enables, for example, modification of a previously drawn image without manual realignment of the image volume and the input surface. In these embodiments, the first positional data, which is indicative of a relative position and orientation of the input surface in relation to the image volume, may be directly determined from the second positional data.

The apparatus may comprise a third position detecting part connected to the input surface, and the second and third position detecting parts may be arranged to cooperate to enable detection of a relative position and orientation of the input surface in relation to the second position detecting part, and the first positional data may be determined using the second and third position detecting parts.

In alternative embodiments a third position detecting part may be connected to the input surface, and thereby be used to determine the first positional data, indicative of a relative position and orientation of the input surface in relation to the image volume. This enables physical movement of the input surface in relation to the second position detecting part to correspond to movement of the input surface within the image volume. This provides a simple mechanism to enable the position and orientation of the input surface to be changed.

The input surface may be connected to a stabilization mechanism. Enabling the input surface to move relative to the image volume makes accurate user input harder as the input surface may be inadvertently moved. Accordingly, the input surface may be connected to a stabilization mechanism, for example a frame or articulated arm. Therefore, while the input surface can be moved by the user, it can also be stabilized in the desired position to enable accurate user input. In such embodiments, the stabilization mechanism may form a part of the third position detecting part—e.g. by having sensors within the articulated arm.

The apparatus may comprise a plurality of second position detecting parts, and the computer readable instructions, when executed by the processing system, may cause the apparatus to: use third positional data determined using one of the second position detecting parts to display the three dimensional image; receive user input identifying another of the second position detecting parts; use third positional data determined using the said other of the second position detecting parts to display the three dimensional image. The computer readable instructions, when executed by the processing system, may further cause the apparatus to calculate second positional data based on the relative positions of the said one and the said another second position detecting parts.

As will have been apparent from the above, an image may be anchored to a second position detecting part—that is it is displayed relative to that part. In embodiments, this anchor may be changed. Therefore, user input may indicate that the anchor is to be changed, meaning that the positional data is calculated based on a different second position detecting part. Accordingly, after this change, any movement of the original anchor will not affect how the image is viewed, whereas movement of the new second position detecting part will affect how the image is viewed. When effecting this change, the second positional data may be recalculated so that the position and orientation of the image volume, at the point of change of anchor, does not change.

The computer readable instructions, when executed by the processing system, may cause the apparatus to: identify a first part of the three dimensional image which is to be displayed as if located on a near side of the input surface as viewed by the user; identify a first part of the three dimensional image which is to be displayed as if located on a far side of the input surface as viewed by the user; and display the three dimensional image within the image volume such that the first part is distinguishable from the second part.

The computer readable instructions, when executed by the processing system, may cause the apparatus to: identify a third part of the three dimensional image which is to be displayed as if located on, or within a predetermined distance of, the input surface; and display the three dimensional image within the image volume such that the third part is distinguishable from parts of the image other than the third part.

When the three dimensional image volume, with the input surface visible within it, is displayed to the user, parts of the image volume will be on the near side of the input surface, as viewed by the user, and the user, i.e. between the input surface and the user or "above" the input surface; other parts will be on the far side of the input surface as viewed by the user, i.e. beyond or "below" the input surface; further parts may be on, or at least close to the input surface. To enable the user to easily distinguish these parts, the apparatus may be configured to display such parts differently so that they may be distinguished by the user. For instance, parts below the input surface may be greyed out while parts on or near the input surface may be highlighted, both in comparison to parts above the input surface.

The apparatus may comprise an interface configured to receive input image data for display using the visualization device. One advantage of the apparatus is it can receive image data which can then be modified using the input surface. In some situations, the received image data may be different to image data created using the apparatus. For example, image data may be received representing a three dimensional object which has been scanned. The apparatus can then be used to modify or annotate the three dimensional object. To provide an example, a surgeon may receive a three dimensional image of a patient's body structure derived from e.g. a MRI or CT scan. The surgeon may, using the apparatus, annotate the image to identify, for example, cut points, and thereby plan a surgery.

The apparatus may comprise an interface configured to output image data for utilization by an external system. Having created or modified an image using the apparatus, the image may be output to use in an external system. For example, an image created using the apparatus may be subsequently input into a computer aided design package where it is converted into a three dimensional image which may in turn be used to control a manufacturing device such as a three dimensional printer or an automated machining tool such as a milling machine.

The apparatus may comprise a plurality of visualization devices, and the apparatus may be configured to display the same three dimensional image volume using each of the visualization devices. It is possible to use the apparatus to collaborate in image creation. Thus a single image may be viewed by multiple users using multiple visualization devices. Each visualization device may view the same image in the same image volume, but from an angle dependent on the position of the visualization device. Accordingly, each visualization device may comprise a corresponding first position detecting part and the apparatus may be configured to determine third positional data for each of the visualization devices.

According to a second aspect of the invention, there is provided a method for use in generating a three dimensional image, the method comprising: displaying, using a visualization device, a three dimensional image volume comprising a three dimensional image, the position and orientation of an input surface being visible within the three dimensional image volume; receiving user input via the input surface, the user input being indicative of a two dimensional image provided in the plane of the input surface; determining first positional data indicative of a relative position and orientation of the input surface in relation to the three dimensional image volume; and modifying the three dimensional image to include a three dimensional representation of the two dimensional image, the three dimensional representation having a position and orientation within the three dimensional image volume determined from the first positional data.

According to a third aspect of the invention, there is provided a computer program for use in generating a three dimensional image, the computer program configured to perform a method comprising: displaying, using a visualization device, a three dimensional image volume comprising a three dimensional image, the position and orientation of an input surface being visible within the three dimensional image volume; receiving user input via the input surface, the user input being indicative of a two dimensional image provided in the plane of the input surface; determining first positional data indicative of a relative position and orientation of the input surface in relation to the three dimensional image volume; and modifying the three dimensional image to include a three dimensional representation of the two dimensional image, the three dimensional representation having a position and orientation within the three dimensional image volume determined from the first positional data.

Further features and advantages will become apparent from the following description of preferred embodiments, given by way of example only, which is made with reference to the accompanying drawings.

BRIEF DESCRIPTION OF THE DRAWINGS

Systems, apparatuses and methods will now be described as embodiments, by way of example only, with reference to the accompanying figures in which:

FIGS. 2A and 2B show detail of the input device 100 shown in FIG. 1;

FIGS. 3A and 3B show detail of the visualization device 200 shown in FIG. 1;

Some parts, components and/or steps of the embodiments appear in more than one Figure; for the sake of clarity the same reference numeral will be used to refer to the same part, component or step in all of the Figures.

DETAILED DESCRIPTION OF CERTAIN INVENTIVE EMBODIMENTS

Figure 1:
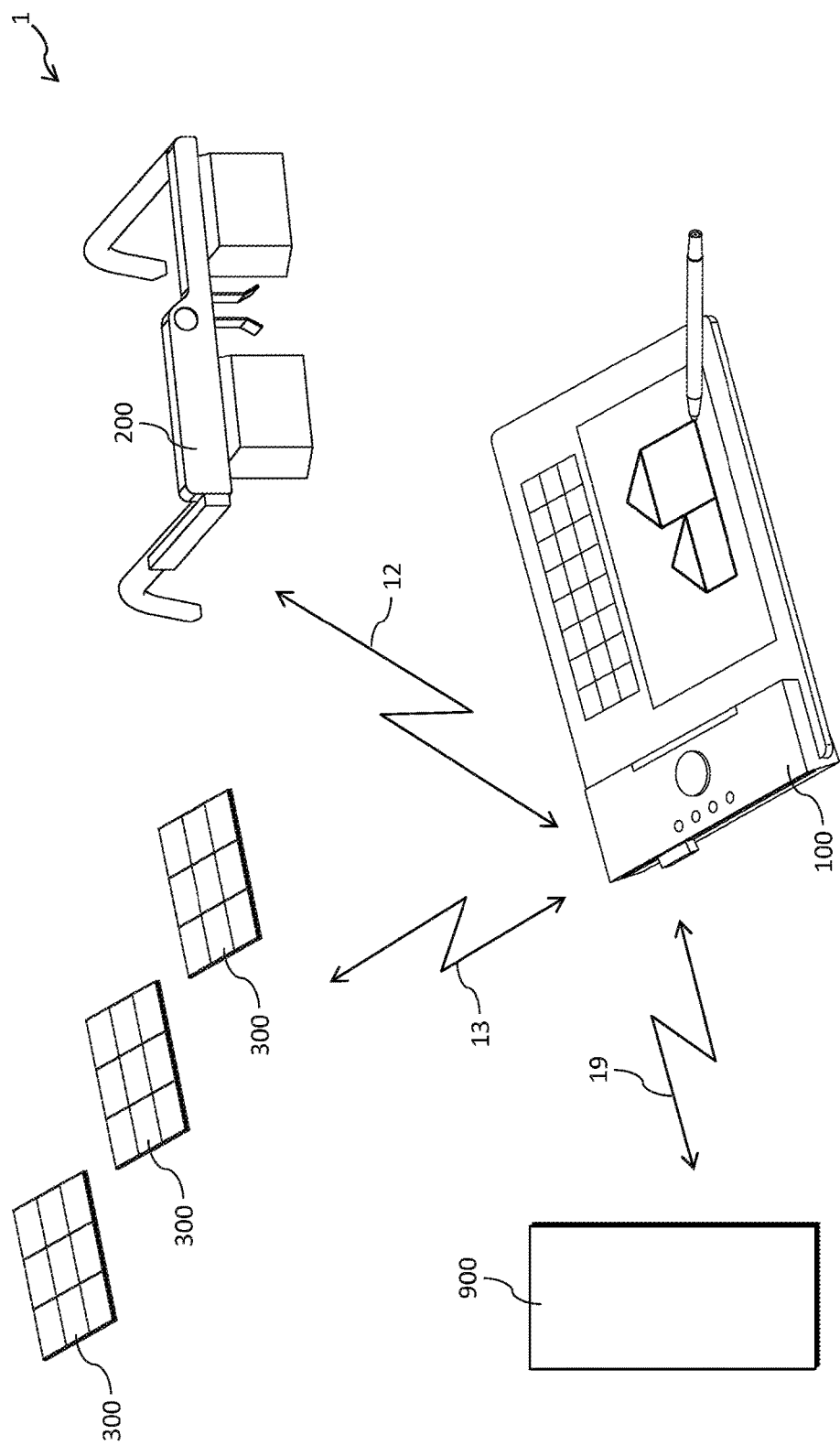
FIG. 1 shows an apparatus 1 for use in generating three dimensional images according to an embodiment.

An apparatus for use in generating three dimensional images according to an embodiment will now be described with reference to FIGS. 1, 2A, 2B, 3A and 3B, where FIG. 1 shows the overall apparatus, and FIGS. 2A/B and 3A/B show details of specific parts of the overall apparatus.

The apparatus 1 comprises an input device 100 and a visualization device 200. The input device 100 and visualization device 200 will be described in more detail in FIGS. 2A/B and 3A/B respectively. In addition, the apparatus may comprise reference tags 300 and one or more external computing systems 900.

The input device 100 is connected to the visualization device 200 via connection 12. In addition, the input device 100 may further be connected to the reference tags 300 via connection 13 and/or to the external computing system 900 via connection 19. Each of these connections 12, 13 and 19 may be made using any known methods. For example, the connections may be wired, using e.g. Ethernet or USB, or may be wireless, using e.g. 802.11 (Wi-Fi), Bluetooth or infrared. Other connections, including proprietary systems, may be used. The external computing system 900 may be a local device, such as a laptop directly connected to the input device 100, but may also be a server or other remote system connected via a network. As such, the external computing system 900 may represent the cloud, with which data may be communicated via the internet.

FIG. 2A shows the input device 100 in more detail. The input device comprises a surface 102 onto which a user may provide user input using a stylus 104. To enable this, the input device comprises a detector 106 which detects the position of the stylus 104 on the input surface. The use of a stylus to provide user input on an input surface is known, and will not be described in detail.

Additionally, the input device 100 may be provided with one or more control elements. These are shown, in this example, as slider 108, joystick 110 and buttons 112, however any arrangement of such control elements is possible. The input device may also comprise a position detecting part 114, the use of which will be described below. Finally, the input device 100 comprises a control unit 116. The control unit 116 will be described in more detail with reference to FIG. 2B.

FIG. 2B shows a schematic diagram of the control unit 116. Within the control unit are processor 118 and memory 120. The memory stores computer readable instructions 122 which are executed by the processing system to enable the operation of the apparatus 1 as will be described below.

The control unit 116 may also comprise an interface 124. This interface may provide wireless or wired communication capabilities to the input device 100 enabling connections 12, 13 and/or 19. The interface 124 may also connect to the detector 106, and control elements 108, 110 and 112 to enable the control unit 116 to receive user input. The control unit 116 may comprise on or more elements of dedicated hardware, represented as 126. These may include gyroscopes and/or accelerometers, the use of which will be described in more detail below. Finally, the control unit 116 may comprise a suitable power supply, represented as battery 128.

FIG. 3A shows visualization device 200 in more detail. Here the visualization device 200 comprises augmented reality glasses. Augmented reality is a process by which a user can view the physical space around them, with additional information displayed as an overlay by the glasses. Such systems are sometimes referred to as a heads-up-display or HUD.

The visualization device 200 comprises screens 202 and 204 which allow transmission of light from the physical space beyond the glasses to the user's eyes, as well as displaying a computer generated image which is viewed by the user as an overlay. Thus, the user will be able to see, for example, the input device 100 while wearing the visualization device 200. The visualization device 200 comprises two screens 202 and 204 enabling the displayed image to be stereoscopic—that is to have depth, or three dimensions as perceived by the user. The presentation of stereoscopic images is known, and need not be described in detail. Nevertheless, it will be realized that where the apparatus is described as displaying a three dimensional image, this will be enabled by the visualization device 200 displaying two, two dimensional, images to the user, one per screen, in a manner so that the user perceives a three dimensional image. It will further be appreciated that the user will perceive this three dimensional image in a particular position, and at a particular orientation, in their three dimensional vision. Consequently, where an image is described as being displayed in a particular position or at a particular location, it will be appreciated that this will be the image, as perceived by the user, and does not mean that any image is physically located in a given position.

The visualization device 200 also comprises a position detecting part 206, shown here in the form of a camera. As will be described in more detail below, the position detecting part 206 of the visualization device 200 may cooperate with the position detecting part 114 of the input device 100 to enable determination of the relative position and orientation of the visualization device 200 in relation to the position detecting part 114 of the input device 100.

Finally, the visualization device 200 comprises a control unit 208, which will be described in more detail with reference to FIG. 3B.

FIG. 3B shows a schematic diagram of the control unit 208 of the visualization device 200. Within the control unit are processor 210 and memory 212. The memory stores computer readable instructions 214 which are executed by the processor 210 to enable the operation of the apparatus as will be described below.

The control unit 208 may also comprise an interface 216. This interface may provide wireless or wired communication capabilities to the visualization device enabling e.g. connection 12. The interface 216 may also connect to the screens 202 and 204, and to the position detecting part 206, to enable the control unit 208 to receive output from the position detecting part 206, and to provide images to be displayed on the screens 202 and 204. The control unit 208 may comprise on or more elements of dedicated hardware, represented as 218. These may include gyroscopes and/or accelerometers, the use of which will be described in more detail below. Finally, the control unit 208 may comprise a suitable power supply, represented as battery 220.

While the apparatus 1 has been described above with the input device 100 being physically disconnected from the visualization device 200, and with each having a separate control unit and processor, this may not be the case. For example, the screens 202 and 204 and camera 206 of the visualization device 200 may be directly connected to the controller of the input device 100. This would in turn mean that the controller 208 of the visualization device 200 can be omitted. In another embodiment, a control unit may be provided which is separate from both the input device 100 and the visualization device 200, and thus control units 116 and 208 may be omitted from the respective devices. Other arrangements will be apparent.

Where multiple processors are provided, the nature and amount of processing which is performed by a given processor may vary. Equally, where multiple memories are provided, different computer readable instructions may be stored in each. Consequently, the apparatus will henceforth be described as having a processing system and memory, with the memory storing computer readable instructions which are executed by the processing system. This will be understood to mean any arrangement of one or more processors and one or more memories which cooperate to enable the operation of the apparatus as will be described. Furthermore, where an operation is described as being performed by the apparatus, it will be understood that this may be performed by one, or a combination, of the elements described above in FIGS. 2A/B and 3A/B.

The operation of the apparatus 1 as described above in FIGS. 1, 2A/B and 3A/B will now be described with reference to FIGS. 4A to 4C. A generalized method will then be described with reference to FIG. 5. In this method, a user is able to draw a three dimensional (3D) image by drawing two dimensional (2D) images onto the input surface 102.

Figure 4A:
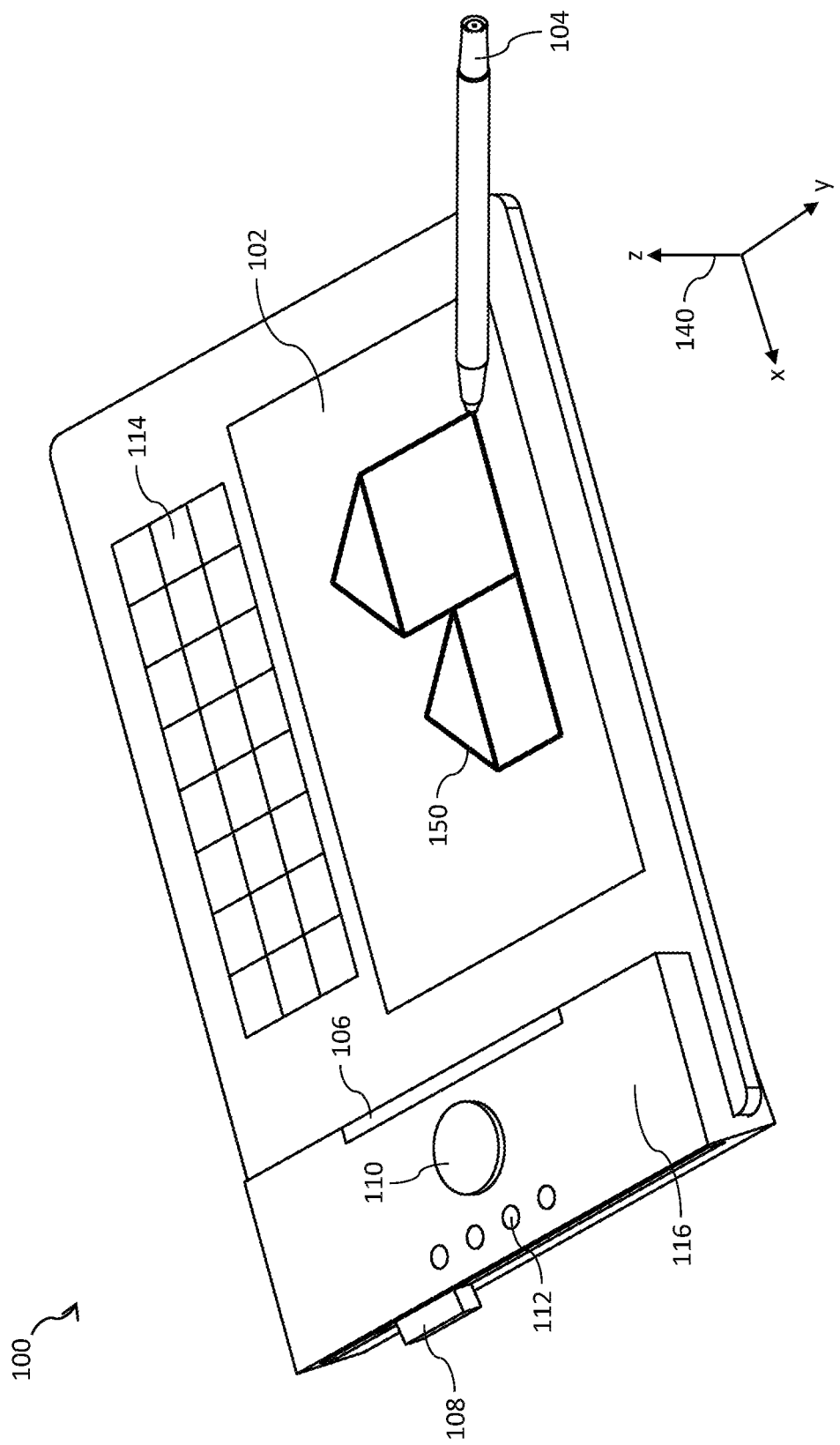
FIGS. 4A to 4C illustrate use of the input device 100 in an embodiment.

FIG. 4A shows the input device 100 as viewed by a user using the visualization device 200. The user, using the stylus 104 has drawn the outline of the side of a pair of buildings onto the input surface 102. This outline is shown as reference 150. The input device 100 itself is seen by the user as a real, physical, object, while the outline 150 is overlaid onto the user's vision by the visualization device 200.

Conceptually, the user is viewing a 3D image volume, within which the input surface 102 is visible. This 3D image volume may be thought of as a 3D analogy to a 2D drawing canvas. The Cartesian axes 140 are intended to illustrate the position and orientation of this 3D image volume in relation to the input surface 102, and will be referred to later.

The image volume comprises a 3D image (which started off as blank), into which the outline 150 has just been drawn. Once the outline 150 has been drawn, the apparatus 1 modifies the 3D image to include a 3D representation of the drawn 2D image (the outline 150). Within the 3D image volume the 3D representation of the outline 150 will have a position and orientation which is determined from the position and orientation of the input surface 102 in relation to the 3D image volume. As such, the 2D image will be added to the 3D image as if it had been drawn onto the input surface 102, in the position and orientation of that surface, within the 3D image volume.

Having drawn the outline 150 the user may then change the position and orientation of the 3D image volume in relation to the input surface 102. This may be done using the control elements 110 and 108. For example the joystick 110 may be used to rotate the image volume, and then the slider 108 may be used to translate the image volume along a direction perpendicular to the plane of the input surface 102.

Figure 4B:
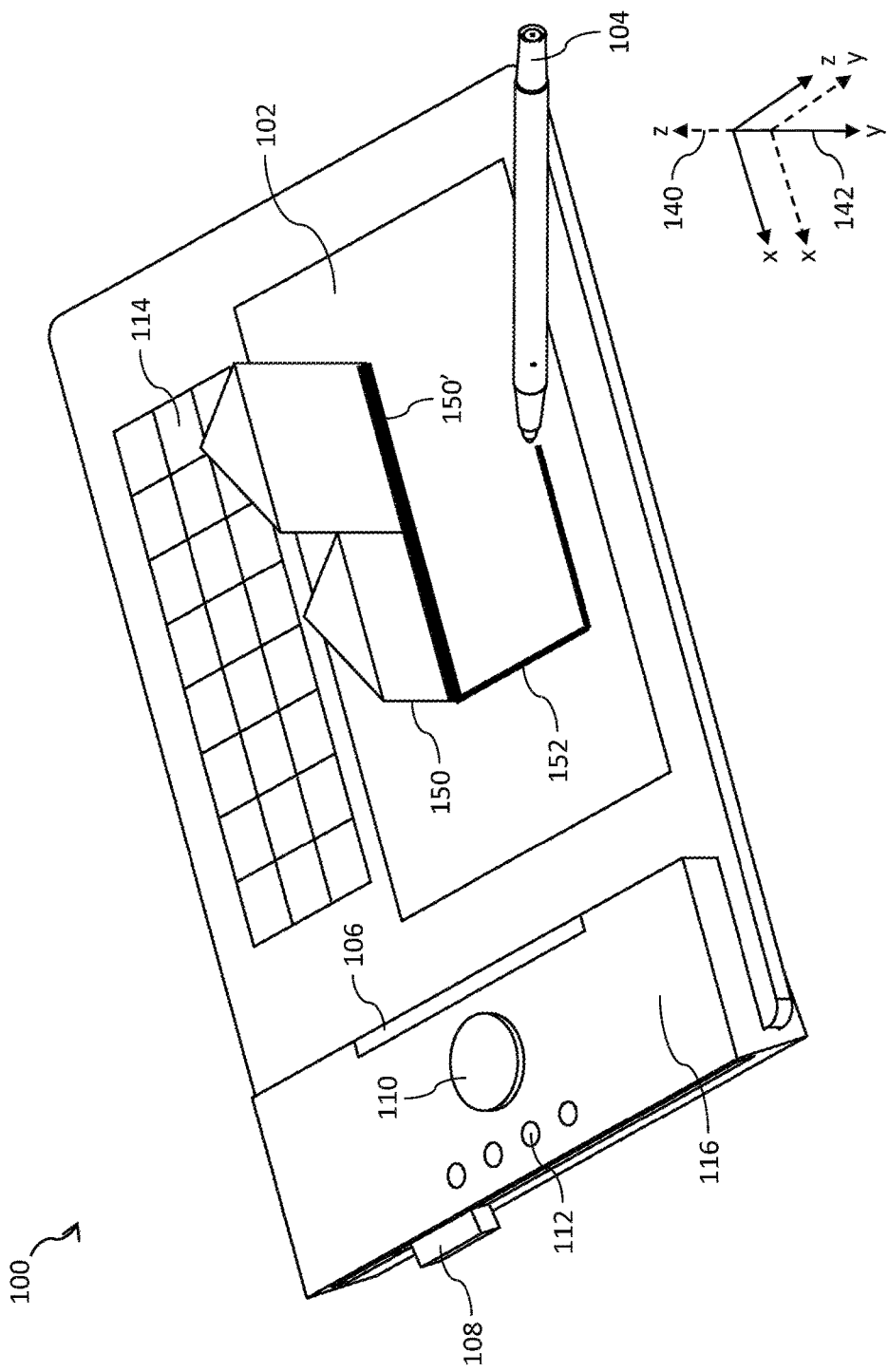

The result of this change in position is shown in FIG. 4B. Here, the axes 142 represents the new orientation of the image volume, with axes 140 showing the original position as dashed lines. The image volume has been rotated 90° around the x-axis, and then translated along the y-axis.

The effect on the viewed 3D image is to present the outline 150 rising above the input surface 102 towards the user. To facilitate the user in identifying the distance by which the image has been translated, or the angle by which it has been rotated, the user may be provided with feedback. Here, this feedback is shown as thickened line 150', which is thickened to indicate that that portion of the 3D drawn image is in (or near) the plane of the input surface 102. This enables the user to know that any new lines drawn, which will be in the pane of the input surface 102, will be aligned with the thickened line 150'. Other feedback, such as identifying given angles (e.g. a right angle) and the like, may also be provided, however this is not shown.

Therefore the user, knowing that the input surface 102 is aligned with the base of the building (thickened line 150') in the outline 150 is able to draw the remainder of the base of the building. This new outline is shown by line 152.

Once again, once the line is drawn, the apparatus 1 modifies the 3D image to include a 3D representation of the drawn 2D image (the outline 152) with a position and orientation which is determined from the position and orientation of the input surface 102 in relation to the 3D image volume at the time the outline 152 was drawn.

The user may continue to draw the buildings, by changing the position and/or orientation of the image volume and drawing further lines. FIG. 4C, shows the next step in the drawing process, here the image volume has been translated along the y-axis so that the base of the roof of the smaller building is in the plane of the input surface 102. This is illustrated by the position of axes 144 in comparison to axes 140.

Once again, the user is provided with feedback. Here the base of the roof, which is a part of the outline 150, is shown with thickened line 150", indicating that that portion of the outline 150 is in the plane of the input surface 102. Furthermore, to assist the user in distinguishing parts of the image which are on the far side of input surface 102 (as viewed by the user) from those on the near side, the apparatus may display the lines differently. Here, those lines on the far side are shown as dashed lines 152 and 150*b*. Those lines on the near side are shown as solid lines 150*a*. Knowing that the input surface 102 is aligned with the appropriate part of the 3D image, the user draws line 154, representing the full outline of the base of the roof of the smaller building. The user may continue to draw into and move the 3D image until the desired 3D image is created.

Consequently, it can be seen that the user is able to build a 3D image by repeatedly drawing a 2D image within the plane of the input surface 102 and then moving the image volume containing the 3D image, in three dimensions, before drawing another 2D image. In each case a 3D representation of the drawn 2D image is included into the 3D image in a position and at an orientation determined by the input surface 102. Throughout this process, the input surface 102 is visible within the 3D image volume. This is most clearly illustrated in FIG. 4C where the image is shown both above and below the input surface 102. Therefore, as the user draws, the 2D drawn lines are included as if draw directly into the 3D image volume.

To enable the above, the apparatus 1 needs to be able to determine a spatial relationships (i.e. the relative position and orientation) between the input surface 102, the visualization device 200, and the 3D image volume. How this is done, and a generalized description of drawing using the apparatus will now be described with reference to FIG. 5.

As described above, the input device 100 has a position detecting part 114 shown as a grid in FIG. 2A. This will typically not be a simple grid, but a more complex image, and will henceforth be referred to as reference image 114. In addition, apparatus 1 stores data indicative of the relative position and orientation, in relation to this reference image 114, at which the 3D image volume is to be displayed. This data will be referred to as second positional data. The effect of this is that the apparatus is able to display the 3D image volume in a relatively consistent manner (defined by the second positional data) in relation to the reference image 114. Thus as the visualization device 200 moves in relation to the input device 100 (and therefore the reference image 114), the displayed image volume will change in a manner as if it were anchored to the input device 100.

To be able to display the 3D image volume correctly, the apparatus needs to know the relative position and orientation of the reference image 114 in relation to the visualization device 200. This is enabled by the position detecting part 206 of the visualization device 200. This was described above as a camera, and henceforth will be referred to as camera 206. In use, the camera 206 repeatedly captures images. Apparatus 1 then identifies the reference image 114 within these captured images, and can calculate the relative position and orientation of the camera 206—and therefore the visualization device 200—in relation to the reference image 114. Method for such image recognition are known, and need not be described in detail. The data produced by this process, indicative of a relative position and orientation of the visualization device 200 in relation to the reference image 114 will be referred to as third positional data.

Consequently, using the second and third positional data, the apparatus is able to calculate a relative position and orientation for the display of the three dimensional image volume in relation to the visualization device 200. This can then be used in the displaying of the three dimensional image volume in a manner as if it were anchored to the reference image 114.

Figure 5:
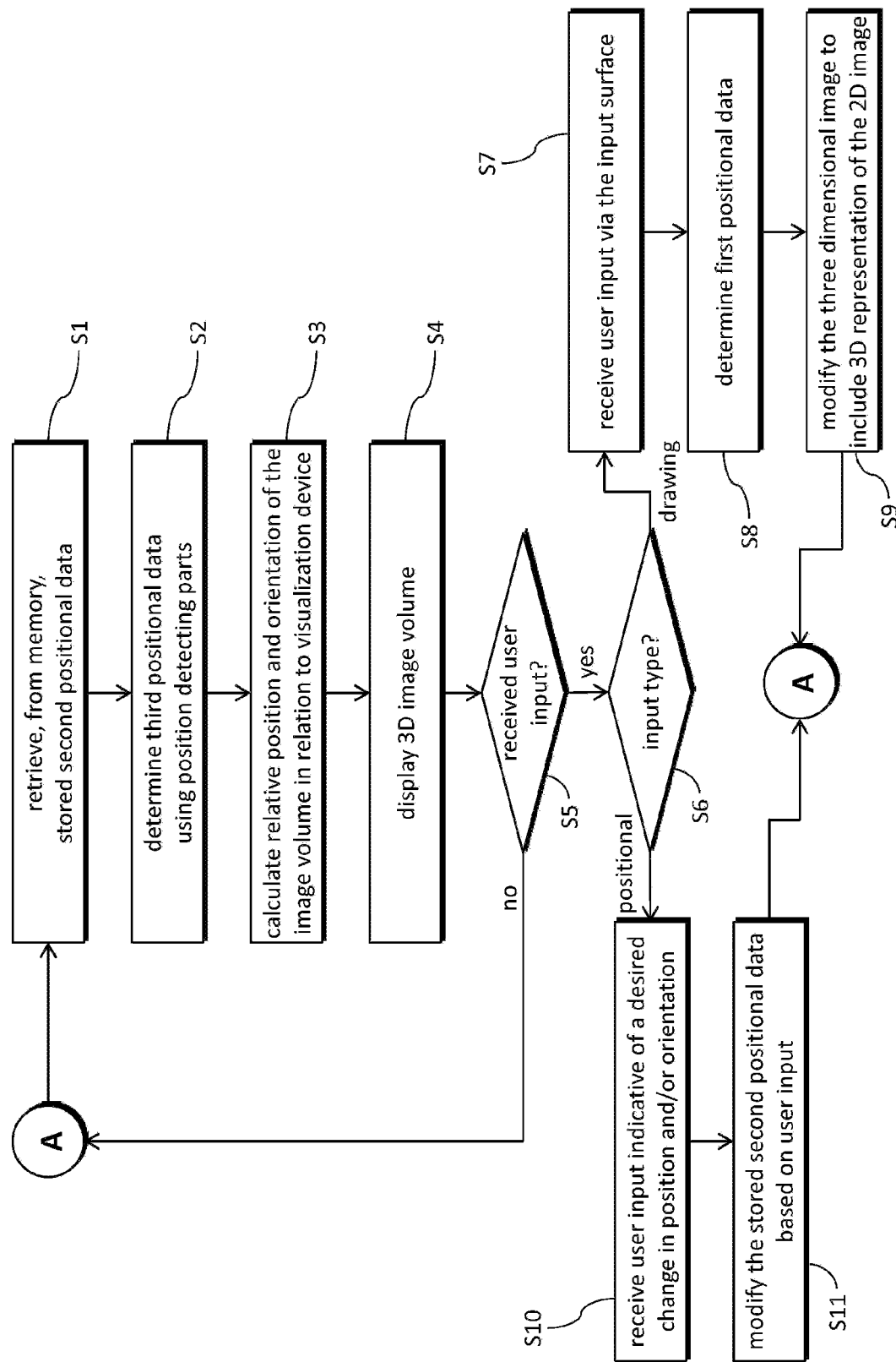
FIG. 5 shows a method according to an embodiment.

A generalized method, performed by the apparatus 1, will now be described with reference to FIG. 5.

In step S1 the apparatus 1 retrieves from memory stored second positional data. This, as described above, is indicative of a relative position and orientation, in relation to the reference image 114, at which the 3D image volume is to be displayed.

In step S2, the apparatus 1 determines, using the camera 206 and the reference image 114 (i.e. the position detecting parts), third positional data indicative of a relative position and orientation of the visualization device 200 in relation to the reference image 114.

Following on, in step S3, the apparatus 1 calculates, using the second and third positional data, a relative position and orientation for the 3D image volume in relation to the visualization device 200 for use in the displaying of the 3D image volume.

Accordingly, in step S4, the apparatus 1 displays, using the visualization device 200, the 3D image volume. The 3D image volume comprises the 3D image—which may also have been stored in the memory and has been retrieved therefrom, or may be a blank image. In addition, it will be apparent that the position and orientation of the input surface 102 is visible within the 3D image volume—in this embodiment by virtue of the image being presented using an augmented reality visualization device 200 and thus the input device 100 and input surface 102, is visible with the image augmented around them.

Steps S1 to S4 may repeat as a loop, updating the image displayed to the user dependent on any change in the relative position and orientation of the visualization device 200 in relation to the reference image 114. This is represented in FIG. 5 as the decision step S5, "received user input?" which, if there is no user input, returns to "A" from which the apparatus 1 repeats steps S1 to S4.

However, in the case that there is user input, the apparatus may perform either of steps S7 to S9, or S10 and S11, depending on whether the user input is a drawing input, e.g. (the user has creating a shape using the stylus 104) or a positional input (e.g. the user providing an input indicative of a change in the position of the image volume).

Therefore, in step S6, the apparatus determines the type of user input, specifically whether the user input is a drawing input or a positional input. In the case that the input is a drawing input, steps S7 to S9 will follow. In the case that the input is a positional input steps S10 and S11 will follow.

In step S7, which is performed when there has been a drawing input, the apparatus receives the (drawing) user input via the input surface 102. This input will typically be indicative of a two dimensional image provided in the plane of the input surface, for example a line, drawn using the stylus 104 on the input surface 102.

Having receive the user input in steps S7, the apparatus determines first positional data indicative of a relative position and orientation of the input surface 102 in relation to the 3D image volume. In this embodiment, as the input surface 102 is connected to the reference image 114, the first data can be directly derived from the second data—allowing for any, constant, positional differences between the input surface 102 and the reference image 114.

Having determined this first positional data, the apparatus 1 can modify the 3D image to include a 3D representation of the 2D image, the 3D representation having a position and orientation within the 3D image volume determined from the first positional data. In other words, the apparatus 1 renders the 2D input image into the 3D image volume in the same position as the input surface 102 on which it was drawn.

Having modified the image appropriately, the modified image is displayed, represented by a return to "A" and thus to step S1, where the apparatus 1 begins the process of displaying the image (now modified).

If, in step S6, it is determined that the user input is a positional input, then in step S10, the apparatus 1 receives this user input which is indicative of a desired change in position and/or orientation of the image volume.

Examples of such an input include one, or a combination of:

a rotation of the image volume about an axis in the plane of the image surface 102;

a rotation of the image volume about an axis perpendicular to the plane of the image surface 102;

a translation of the image volume in a direction in the plane of the image surface 102;

a translation of the image volume along a direction perpendicular to the plane of the image surface 102; and a change in a relative size of the image volume.

The above have been described in relation to the input surface 102 as the user will be focussed on the input surface 102. However, it will be appreciated that the apparatus 1 may appropriately interpret such input such that, the second data, which relates the image volume to the reference image 114, will be modified to effect the changes.

Consequently, based on the user input, and any processing required, in step S11, the apparatus 1 modifies the stored second positional data in accordance with the received user input. Following step S11, the apparatus will again display the 3D image in the 3D image volume, but with the modified second positional data. This is represented by the arrow to step "A", which leads to step S1.

Accordingly, the apparatus displays a 3D image volume to a user with the input surface 102 visible within the volume. The user may change the perspective, i.e. move the image volume in relation to the input surface 102, and may also provide input such as a drawing input which is then added to the displayed image. The display is continuously updated, to account for any relative movement of the user and thus the visualization device 200 in relation to the input device 100.

This provides an efficient method of drawing in three dimensions.

Additional Details and Modifications

Figure 6:
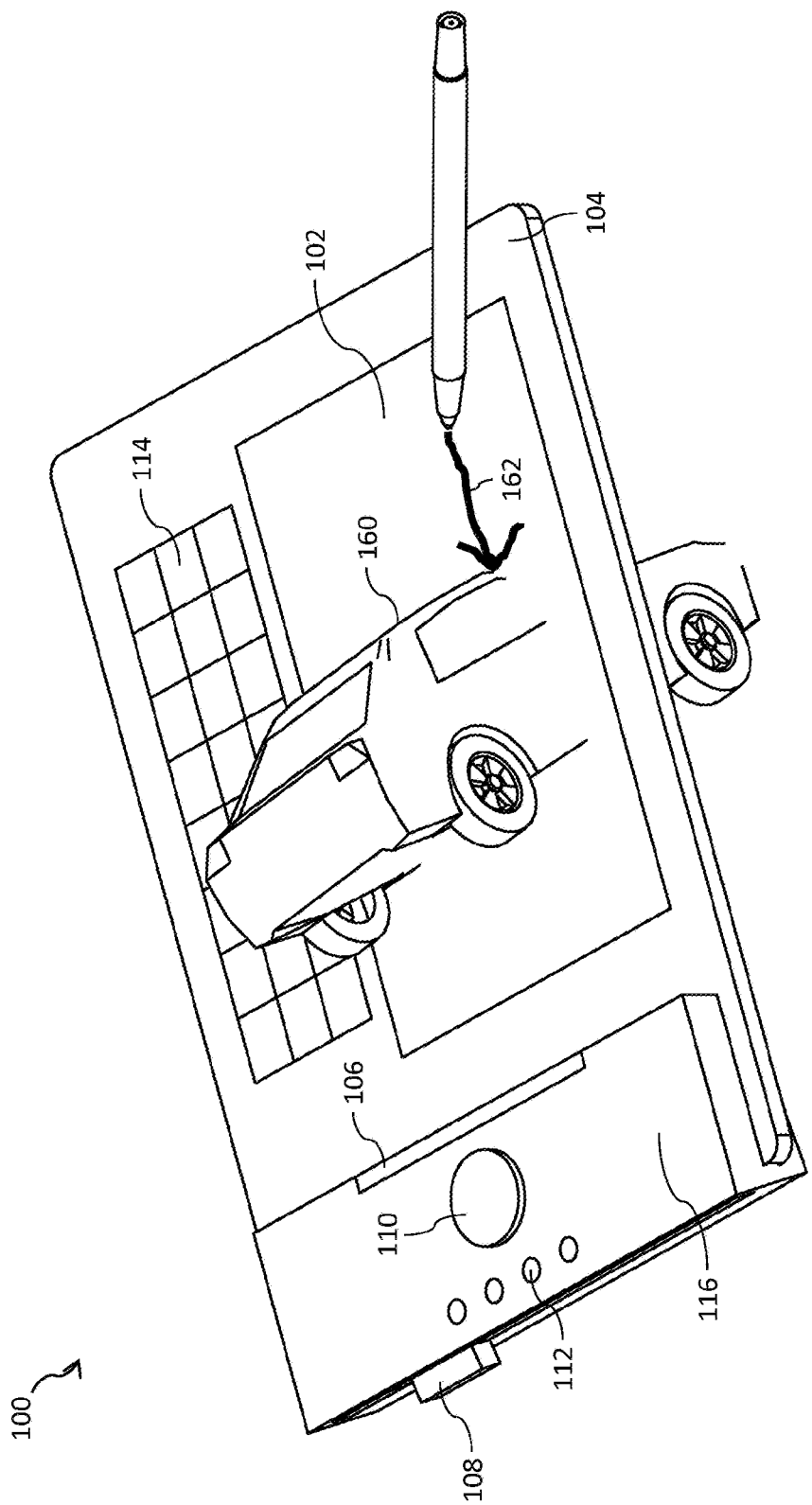
FIG. 6 illustrates use of the input device 100 in an embodiment.

The apparatus 1 need not be used solely for the creation of images, but can also be used to annotate and modify existing 3D images. This is illustrated in FIG. 6. FIG. 6 illustrates the input device 100, with an image 160 (representing a car) displayed. In this embodiment, it can be assumed that the image 160 is a complex 3D representation of the car, and has been received from an external source, for example the remote computing system 900. The 3D image may have been derived from, for example, a computer aided design (CAD) file or a scan of an existing physical structure. Nevertheless, the apparatus 1 is able to display this 3D image within the 3D image volume, with the input surface 102 again visible within the image volume.

Figure 4C:
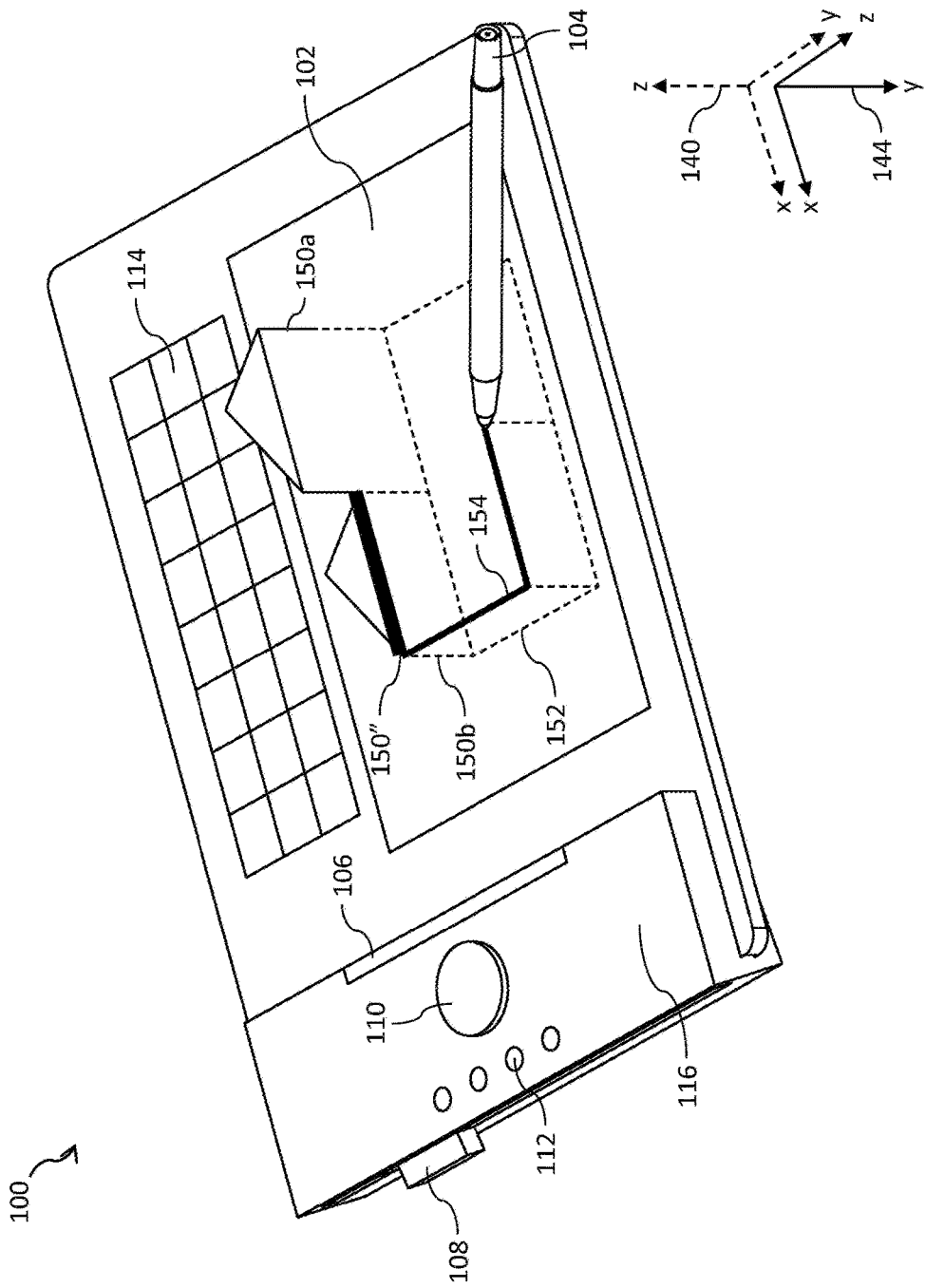

Here, the image 160 is displayed in a different manner to how the buildings were displayed in FIG. 4C. Specifically, only the part of the image which is on the near side of the input surface 102 as viewed by the user is visible. This illustrates another method by which the presence of the input surface 102 within the 3D image can be illustrated; however the image 160 could equally have been illustrated in a manner similar to FIG. 4C, using dashed lines etc.

As well as viewing the image, the user is able to annotate the imported image 160 by drawing using the stylus 104. A possible user input is shown by the shape 162, which has been draw into the 3D image. Therefore, the apparatus 1 may import an image from an external source and display that image. A user may navigate around the image, i.e. changing it position and orientation, and may also modify the image—i.e. to provide an annotation. Subsequently, the modified image may be output, to e.g. remote computing system 900, for viewing by other users.

The above description of the apparatus 1 has the position detecting part, i.e. the reference image 114, as an integral part of the input device 100. However, in embodiments, the position detecting part (or additional position detecting parts) may be physically separated from the input device 100. For example, FIG. 1 illustrated a number of tags 300. Each tag 300 may comprise a position detecting part. The apparatus may therefore present 3D images in relation to each of the tags—effectively anchoring the image to the tag 300, as opposed to the input device 100.

To enable this, the user may be able to provide suitable user input indicating that a 3D image is to be moved onto a tag. Prior to the user input, the 3D image will be displayed relative to the reference image 114 of the input device 100, moving with the input device 100. The user may select a given tag 300, and indicate that the image is to be moved to that tag 300. Upon providing this user input, the apparatus 1 may calculate second positional data relating to the 3D image and tag 300, and use this data to display the image. Following on from there, the image will be displayed as if anchored to the tag 300, with the relative movement of the tag 300 determining how the image is displayed, and any movement of the input device 100 not affecting the display of the image.

When moving the image to the tag, the apparatus 1 may, prior to the move, determine tag specific second positional data (indicative of the relative position and orientation of the image volume to the tag 300), and store this determined second positional data in memory. Following on from this, the apparatus 1 may then use the newly stored second positional data in displaying the 3D image as if anchored to the tag 300. This has the effect that at the point of transfer, there is no change in how the image is viewed by the user.

To determine the tag specific second positional data, the apparatus may determine fourth positional data indicative of the relative position and orientation of the tag 300 to the visualization device 200. The second, third and fourth positional data together provides a series of relative positions and orientations which link the 3D image volume to the reference image 114, the reference image to the visualization device 200, and the visualization device 200 to the tag 300. Therefore, the second, third and fourth positional data may be used in combination to determine the tag specific second positional data, which then may be stored.

This process may be used to share images, or to move a first 3D image off the input device 100, enabling a second 3D image to be generated, while maintaining the visibility of the first 3D image. Where multiple images are displayed, the apparatus may store second positional data, and determine first and third positional data, for each combination of tag 300 and image, as well as for the any image anchored to the input device 100.

Figure 7:
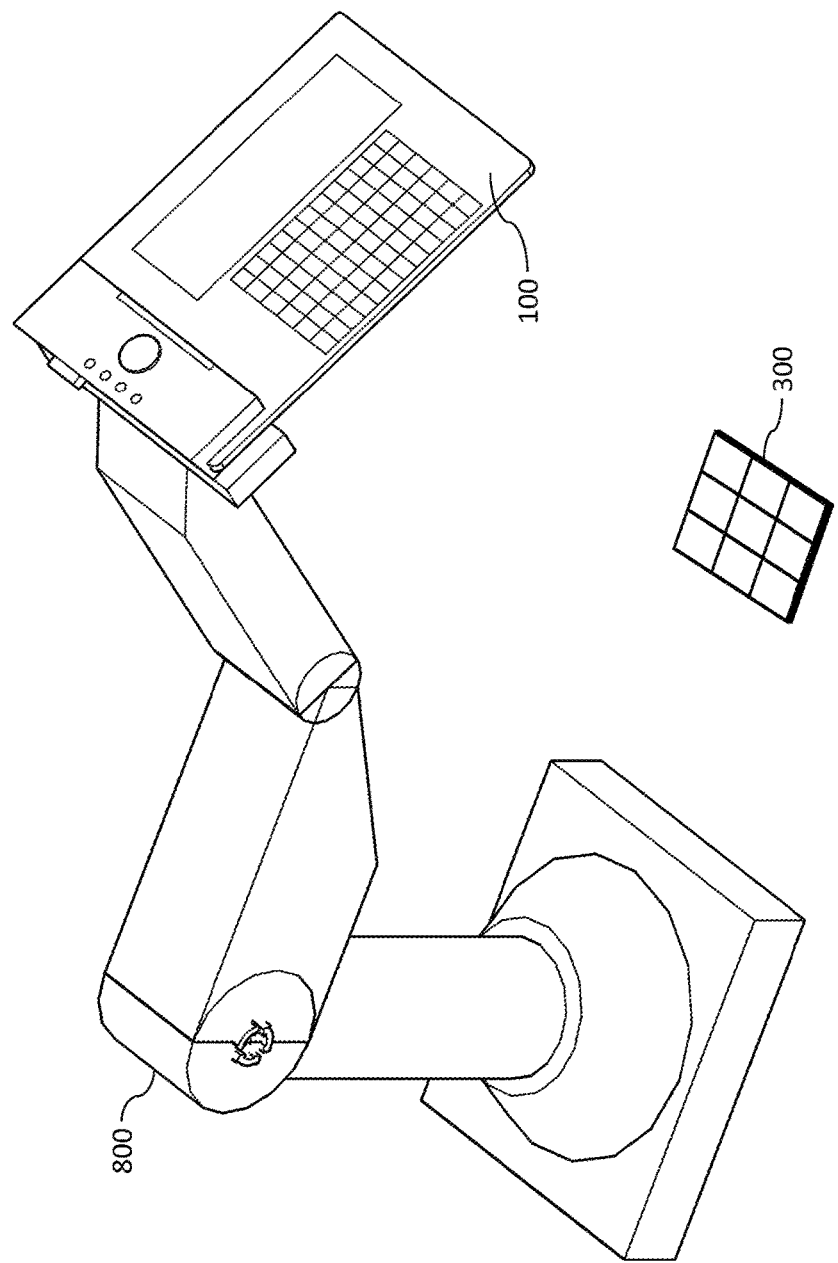
FIG. 7 shows an input device 100 mounted on a stabilization mechanism in accordance with an alternative embodiment.

A further embodiment will be describe with reference to FIG. 7. This embodiment differs from the embodiments described above in that the reference image 114 on the input device 100 is not used as an anchor for the image. Instead, the image is anchored to a tag 300, separate from the input device 100.

In this embodiment, the input device 100 is capable of being moved in relation to the 3D image which remains anchored to the tag 300. Thus physical movement of the input device 100 or of the tag 300 provides the user input which defines the relative position of the input device 100 in relation to the 3D image.

Totally free movement of the input device 100 can cause problems with shake and jitter. Consequently, in such embodiments, the input device 100 may be attached to a stabilization device, shown here as an articulated arm 800. The arm 800 may be arranged to enable the input device 100 to be freely moved, and then to lock, or resist further movement of, the input device 100 while a drawing user input is made.

In such an embodiment, the apparatus cannot determine the first positional data (indicative of the relative position and orientation of the input surface 102 in relation to the 3D image volume) directly from the second positional data. This is because the anchor for the image is no longer fixed to the input device 100 (the anchor for the image is the tag 300 and not the reference image 114). Consequently, the apparatus 1 may be configured to determine the relative position and orientation of the input device 100 in relation to the tag 300. This may be done using the camera 206 of the visualization device 200 to identify the position and orientation of the input device 100 (using the reference image 114) and of the tag 300, and by calculating the difference in position. In such embodiments, the camera 206 forms a first position detecting part, the tag 300 forms a second position detecting part, and the reference image 114 of the input device 100 forms a third position detecting part. Alternatively, or additionally, the arm 800 may serve, at least partially, as the third position detecting part. The articulated arm 800 may comprise sensors which enable the position and orientation of the input device 100 to be determined in relation to the tag 300. In such embodiments, the tag 300 may be fixed to the articulated arm 800 so that the arm is able, using its sensors, to determine the relative position and orientation of the tag 300 to the input surface 102 of the input device 100. Consequently, the image volume may be displayed in a relative constant manner in relation to tag 300, and yet the input device 100 may move around and through the 3D image as required to provide a suitable user input.

In FIGS. 2B and 3B, the control units 116 and 208 were described as potentially containing gyroscopes and/or accelerometers. These, may be used to provide additional position and orientation data for the apparatus to use in displaying the 3D image. For instance, the use of the camera 206 and reference image 114 may be able to detect large scale movement, however smaller movements may go undetected. Alternatively, the response time of the camera based system may not be sufficient. Consequently, the output of any gyroscope or accelerometer may be used to determine fine scale movement any of the visualization device 200, input device 100, or even a tag 300. Therefore, the apparatus 1 may combine data form the gyroscopes and/or accelerometers with data determined using the camera 206, to determine the first and/or third positional data as described above.

In embodiments the tags may simply provide a reference image (analogous to reference image 114) onto which the apparatus may anchor a 3D image. Consequently, the tags 300 may not have any electrical components. However in other embodiments, the tags 300 may be provided with electrical components. For example, a tag may be provided with communications capabilities and storage capabilities enabling it to store an image which has been anchored to it. The tag 300 may receive image data via connection 13, and store it in an on-board memory (not shown). Thus the tags may be independent of the input device 100, and may be used, for example, to transfer image data between input devices. In such embodiments, the tags may be configured to be powered, and to have data transferred thereto, using techniques such as near field communications (NFC)—removing the need for the tag to have a separate power supply. However it will be apparent that any suitable technique can be used.

In the above, the drawing user input was provided using a stylus, and the positional user input was provided using the control elements 108 and 110. However this may not be the case, and the drawing input may be provided using e.g. a finger, or by using control elements such as joystick 108. Equally, the positional user input may be provided using the input surface, i.e. by tapping or selecting certain areas of the input surface. In some embodiments, so called "gestures" may be used. These are known and include multiple finger actions to provide specific input—for example a pinch action could be used to zoom an image, or translate the image in a direction perpendicular to the input surface 102.

In the above, the user is provided with feedback in the form of changes to the displayed 3D image based on the position of that part of the image in relation to the input surface 102. It will be appreciated that the examples provided were limited by the nature of line drawings. Consequently, colour, greying, blurring and other techniques may be used to provide feedback, in particular to identify parts of the image which are above or below the input surface 102. In addition, other feedback mechanisms may be used, for example audio and tactile feedback (i.e. vibrations).

While the above has been described in terms of an augmented reality type system, with the input surface physically visible to the user, other embodiments may use a virtual reality system—i.e. one where the user sees only a computer generated visualization and cannot view the surrounding space. In such a system, the input surface may be presented in the virtual world would in a position, and at an orientation, corresponding to the input surface 102 in the real world. This maintains the instinctive link between input and the image.

In some embodiments, the visualization device 200 may be provided by a stereoscopic screen which is not user mounted. For example, as a screen on the input device 100. This screen may be autostereoscopic, meaning it is capable of displaying a 3D image without the use of special glasses. An example of an autostereoscopic display is one with a parallax barrier in front. Alternatively, a user may wear special glasses, which use e.g. polarizers to provide a different image to each eye, and are therefore able to present a 3D image. Such systems are known, and are used in, for example, televisions. Such systems may still require position detecting parts to enable the image appear anchored to e.g. the input device 100.

A further alternative is a holographic display. Here the visualization device 200 may again be contained within the input device 100, but be configured to display a holographic image which appears to a viewer to be three dimensional.

In addition, while the use of two screens 202 and 204 enable a user to view the three dimensional image spectroscopically, it is possible for embodiments to use a single screen. In such embodiments, the user can achieve a sense of depth by moving the visualization device 200 in relation to the reference image 114 or tag 300. This movement will cause the viewed image to change in a manner as if it was three dimensional. Consequently, an image can be created which will appear, through movement of the visualization device 200 or reference image 114, to be three dimensional, even though viewed using only a single screen. The analogy here being viewing a three dimensional object through one eye from different angles. In embodiments with only a single screen, colouring, greying etc may still be used to identify parts of the image that are above or below the input surface.

The input surface may, or may not, be transparent. It will be apparent that since the image is created by the screens 202 and 204, and does not come from the input device, it would still be possible for a user to be presented with an image which appears to be on the far side of an opaque screen. The input surface 102 may be provided with guides, such as gridlines, angle lines etc. In embodiments, the input surface may be provided with a ridge or similar to serve as a ruler for drawing straight or regularly curved lines. This ruler may be moveable within the plane of the input surface 102.

In the above embodiments, the visualization device 200 comprises a camera 206 and the input device 100 comprises a visible reference image 114. However, in alternative embodiments, these components may be reversed, with the camera being mounted on the input device 100 and the visualization device 200 being provided with a suitable reference image. In some embodiments, a reference image on the visualization device 200 may be excluded, and the apparatus may use, for example, face and eye tracking technology to determine the position and orientation of the user's vision.

The position detecting parts have been described in terms of a camera 206 and one or more reference images 114, aided, as required, by data from accelerometers, gyroscopes, and the stabilization mechanism 800. However, it will be appreciated that these are non-limiting examples, and that any combination of suitable hardware may be used. Examples include using patterns of light emitters (visible or infrared) instead of reference images; or using radio triangulation to position the various components. Other techniques may be used.

Gyroscopes may form or augment any stabilization mechanism. As such, gyroscopes may provide both a stabilizing and sensing function.

In embodiments, multiple visualization devices 200 and/or multiple input devices 100 may be used in a cooperating manner. For example a single input device 100 may be viewed by multiple users, each using their own visualization device 200. In such cases, the same 3D image may be viewed by all users with each user viewing the image based on their own position and orientation. In addition, multiple input devices 100 may be used, each showing the same image. This may mean that different users may define the angle at which the image anchored to their input device 100 may be viewed. However, the images may be synchronized, meaning that changes to one image (i.e. addition of a 2D drawing) will affect all images. Other collective applications will be apparent.

In the above, the positional user input was provided in the form of direct control of the position of the 3D image volume. However in embodiments the user may be provided with the ability to select a portion of an image—for example a previously drawn line—and have the image volume moved so that the selected 2D image is in the plane of the input surface 102. The user may then edit or remove this 2D image. Other techniques, where e.g. a point is selected and then user input is provided to rotate the image about that point, may be used. The user may have the option to e.g. undo, redo, select, cut, copy, paste, move etc 2D drawings within the 3D drawing. To enable this each 2D drawing may be conceptually considered an object, and the user may select an object, perform an action (e.g. copy it) and then move the location of the image volume in relation to the input device 100 before e.g. pasting the object.

The input device 100 has been described as having a slider 108 and a joystick 110 to enable repositioning of the 3D image volume. However, other control elements may be provided. For example, a further joystick may be provided to enable translation of the image volume in directions parallel to the plane of the input surface.

While the input surface has been described as being flat, this may not be the case. For example, the apparatus may be configured with multiple input surfaces, one flat, others curved or of specific shapes to facilitate drawing.

Finally, while only drawing using a stylus has been described as an example of a drawing user input, any 2D user input may be used. For example, a square or other predefined shape may be created, with a size defined by the user, and thus form the 2D image. A user may "fill" a shape with a colour. Images, such as a photo, may be imported and inserted into the 3D image volume. Other 2D inputs, as are established in the field of 2D illustration and drawing, can be used.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. Apparatus for use in generating a three dimensional image, the apparatus comprising:
   an input device comprising an input surface;
   a visualization device,
   a processing system; and
   a memory,
   wherein the memory comprises computer readable instructions which, when executed by the processing system, cause the apparatus to:

display, using the visualization device, a three dimensional image volume comprising a three dimensional image, the position and orientation of the input surface being visible within the three dimensional image volume;
receive first user input via the input surface, the first user input being indicative of a two dimensional image provided in a plane of the input surface;
determine first positional data indicative of a relative position and orientation of the input surface in relation to the three dimensional image volume;
modify the three dimensional image to include a three dimensional representation of the two dimensional image, the three dimensional representation having a position and orientation within the three dimensional image volume determined from the first positional data;
receive second user input indicative that at least one of a position or an orientation of the three dimensional image in relation to the input surface is to be changed;
in response to the second user input, change the at least one of the position or the orientation of the three dimensional image in relation to the input surface so as to display, using the visualization device:
a first part of the three dimensional image as if located on a near side of the input surface as viewed by a user; and
a second part of the three dimensional image as if located on a far side of the input surface as viewed by the user; and
during the display of the three dimensional image with the first part displayed as if located on the near side of the input surface as viewed by the user and the second part displayed as if located on the far side of the input surface as viewed by the user, receive third user input via the input surface,
wherein the third user input is indicative of a further two dimensional image provided in the plane of the input surface, which plane intersects the three dimensional image such that the first part of the three dimensional image is located at an opposite side of the plane to the second part of the three dimensional image.

2. The apparatus of claim 1, wherein the visualization device comprises an augmented reality display device configured to display the three dimensional image volume while enabling the user to see the input surface.

3. The apparatus of claim 1, wherein the visualization device comprises a virtual reality display device configured to display both the three dimensional image volume and a virtual rendering of the input surface, the virtual rendering of the input surface being positioned and orientated based on a physical position and orientation of the input surface.

4. The apparatus of claim 1, wherein:
the visualization device comprises a first position detecting part;
the apparatus comprises a second position detecting part, separate from the first position detecting part, the first and second position detecting parts configured to cooperate to enable determination of a relative position and orientation of the visualization device in relation to the second position detecting part; and
the memory is configured to store second positional data indicative of a relative position and orientation, in relation to the second position detecting part, at which the three dimensional image volume is to be displayed,
wherein the computer readable instructions, when executed by the processing system, cause the apparatus to:
retrieve, from memory, stored second positional data;
determine, using the first and second position detecting parts, third positional data indicative of a relative position and orientation of the visualization device in relation to the second position detecting part; and
calculate, using the second and third positional data, a relative position and orientation for the three dimensional image volume in relation to the visualization device for use in the displaying of the three dimensional image volume.

5. The apparatus of claim 4, wherein the computer readable instructions, when executed by the processing system, cause the apparatus to modify the stored second positional data in accordance with the second user input.

6. The apparatus of claim 5, wherein the second user input is received via the input surface.

7. The apparatus of claim 5, wherein the apparatus comprises one or more control elements configured to receive the second user input.

8. The apparatus of claim 5, wherein the second position detecting part and the input surface are physically connected whereby to have a constant relative position and orientation.

9. The apparatus of claim 8, wherein the second user input is indicative of one or more of:
a rotation of the three dimensional image volume about an axis in the plane of the image surface;
a rotation of the three dimensional image volume about an axis perpendicular to the plane of the image surface;
a translation of the three dimensional image volume in a direction in the plane of the image surface;
a translation of the three dimensional image volume along a direction perpendicular to the plane of the image surface; and
a change in a relative size of the three dimensional image volume.

10. The apparatus of claim 4, wherein the computer readable instructions, when executed by the processing system, cause the apparatus to:
receive fourth user input identifying a two dimensional image within the three dimensional image; and
modify the second positional data such that the three dimensional image volume is displayed with the two dimensional image identified by the fourth user input aligned with the input surface.

11. The apparatus of claim 4, wherein the apparatus comprise a third position detecting part connected to the input surface, and the second and third position detecting parts are arranged to cooperate to enable detection of a relative position and orientation of the input surface in relation to the second position detecting part, and the first positional data is determined using the second and third position detecting parts.

12. The apparatus of claim 11, wherein the input surface is connected to a stabilization mechanism.

13. The apparatus of claim 4, wherein the apparatus comprises a plurality of second position detecting parts, and the computer readable instructions, when executed by the processing system, cause the apparatus to:
use third positional data determined using one of the second position detecting parts to display the three dimensional image;
receive fifth user input identifying an other one of the second position detecting parts; and
use third positional data determined using the other one of the second position detecting parts to display the three dimensional image.

14. The apparatus of claim 13, wherein the computer readable instructions, when executed by the processing system, cause the apparatus to calculate second positional data based on the relative positions of the one and the other one of the second position detecting parts.

15. The apparatus of claim 1, wherein the computer readable instructions, when executed by the processing system, cause the apparatus to
during the display of the three dimensional image with the first part displayed as if located on the near side of the input surface as viewed by the user and the second part displayed as if located on the far side of the input surface as viewed by the user, display the three dimensional image within the image volume such that the first part is distinguishable from the second part.

16. The apparatus of claim 1, wherein the computer readable instructions, when executed by the processing system, cause the apparatus to:
identify a third part of the three dimensional image which is to be displayed as if located on, or within a predetermined distance of, the input surface; and
display the three dimensional image within the three dimensional image volume such that the third part is distinguishable from parts of the three dimensional image other than the third part.

17. The apparatus of claim 1, wherein the apparatus comprises an interface configured to receive input image data for display using the visualization device.

18. The apparatus of claim 1, wherein the apparatus comprises an interface configured to output image data for utilization by an external system.

19. The apparatus of claim 1, wherein the apparatus comprises a plurality of visualization devices, and wherein the apparatus is configured to display the same three dimensional image volume using each of the plurality of visualization devices.

20. A method for use in generating a three dimensional image, the method comprising:
displaying, using a visualization device, a three dimensional image volume comprising a three dimensional image, the position and orientation of an input surface of an input device being visible within the three dimensional image volume;
receiving first user input via the input surface, the first user input being indicative of a two dimensional image provided in a plane of the input surface;
determining first positional data indicative of a relative position and orientation of the input surface in relation to the three dimensional image volume;
modifying the three dimensional image to include a three dimensional representation of the two dimensional image, the three dimensional representation having a position and orientation within the three dimensional image volume determined from the first positional data;
receiving second user input indicative that at least one of a position or an orientation of the three dimensional image in relation to the input surface is to be changed;
in response to the second user input, changing the at least one of the position or the orientation of the three dimensional image in relation to the input surface so as to display, using the visualization device:
a first part of the three dimensional image as if located on a near side of the input surface as viewed by a user; and
a second part of the three dimensional image as if located on a far side of the input surface as viewed by the user; and
during the display of the three dimensional image with the first part displayed as if located on the near side of the input surface as viewed by the user and the second part displayed as if located on the far side of the input surface as viewed by the user, receiving third user input via the input surface,
wherein the third user input is indicative of a further two dimensional image provided in the plane of the input surface, which plane intersects the three dimensional image such that the first part of the three dimensional image is located at an opposite side of the plane to the second part of the three dimensional image.

21. A non-transitory computer-readable storage medium comprising a set of computer-readable instructions stored thereon, which, when executed by a processing system, cause the processing system to control performance of a method for use in generating a three dimensional image, the method comprising:
displaying, using a visualization device, a three dimensional image volume comprising a three dimensional image, the position and orientation of an input surface of an input device being visible within the three dimensional image volume;
receiving first user input via the input surface, the first user input being indicative of a two dimensional image provided in a plane of the input surface;
determining first positional data indicative of a relative position and orientation of the input surface in relation to the three dimensional image volume;
modifying the three dimensional image to include a three dimensional representation of the two dimensional image, the three dimensional representation having a position and orientation within the three dimensional image volume determined from the first positional data;
receiving second user input indicative that at least one of a position or an orientation of the three dimensional image in relation to the input surface is to be changed;
in response to the second user input, changing the at least one of the position or the orientation of the three dimensional image in relation to the input surface so as to display, using the visualization device:
a first part of the three dimensional image as if located on a near side of the input surface as viewed by a user; and
a second part of the three dimensional image as if located on a far side of the input surface as viewed by the user; and
during the display of the three dimensional image with the first part displayed as if located on the near side of the input surface as viewed by the user and the second part displayed as if located on the far side of the input surface as viewed by the user, receiving third user input via the input surface,
wherein the third user input is indicative of a further two dimensional image provided in the plane of the input surface, which plane intersects the three dimensional image such that the first part of the three dimensional image is located at an opposite side of the plane to the second part of the three dimensional image.

* * * * *